United States Patent
Pujol et al.

(10) Patent No.: US 9,434,654 B2
(45) Date of Patent: Sep. 6, 2016

(54) COLOURED TECHNICAL CERAMIC BODIES AND METHOD FOR PREPARING THE SAME

(71) Applicant: ROLEX S.A., Genève (CH)

(72) Inventors: Ollivier Pujol, Lausanne (CH); Carine Bienvenu, Pringy (FR)

(73) Assignee: Rolex S.A. (CH)

( * ) Notice: Subject to any disclaimer, the term of this patent is extended or adjusted under 35 U.S.C. 154(b) by 0 days.

(21) Appl. No.: 14/647,642

(22) PCT Filed: Dec. 20, 2013

(86) PCT No.: PCT/EP2013/077606
§ 371 (c)(1),
(2) Date: May 27, 2015

(87) PCT Pub. No.: WO2014/096319
PCT Pub. Date: Jun. 26, 2014

(65) Prior Publication Data
US 2015/0307406 A1   Oct. 29, 2015

(30) Foreign Application Priority Data

Dec. 21, 2012 (EP) .................................. 12198975

(51) Int. Cl.
*C04B 35/00* (2006.01)
*C04B 35/64* (2006.01)
(Continued)

(52) U.S. Cl.
CPC ............... *C04B 35/64* (2013.01); *C04B 35/10* (2013.01); *C04B 41/009* (2013.01);
(Continued)

(58) Field of Classification Search
CPC .............. C04B 20/10; C04B 20/1059; C04B 20/1092; C04B 35/48; C04B 35/486; C04B 35/488; C04B 35/4885; C04B 35/111
USPC ................................................. 501/127, 153
See application file for complete search history.

(56) References Cited

U.S. PATENT DOCUMENTS

| 4,624,812 A | * | 11/1986 | Farrow | C04B 35/634 264/639 |
| 5,326,518 A | * | 7/1994 | Kimura | B28B 1/24 264/328.2 |

(Continued)

FOREIGN PATENT DOCUMENTS

| DE | 2012304 A1 | 9/1971 |
| DE | 19701080 C1 | 7/1998 |

(Continued)

OTHER PUBLICATIONS

Liu et al. Fabrication of coloured zirconia ceramics by infiltrating water debound injection moulded green body. Advances in Applied Ceramics 2010. pp. 1-5.*

(Continued)

*Primary Examiner* — Noah Wiese
(74) *Attorney, Agent, or Firm* — Barnes & Thornburg LLP

(57) ABSTRACT

The present invention relates to novel technical ceramic bodies and a method for preparing these technical ceramic bodies. The method of the invention for the production of a coloured technical ceramic body comprises the following steps: providing a composition comprising alumina, at least one pigment component and optionally binder materials, preparing a green body from this composition, optionally debinding the green body, thereafter subjecting the green body to a treatment with a metal-containing preparation as a further pigment component, and sintering the treated green body. The coloured technical ceramic body of the present invention consists of alumina as a technical ceramic material, the technical ceramic body comprising a first coloured area and a second coloured area of a different colour, whereby the first coloured area contains a first pigment component, and the second coloured area contains a second pigment component in combination with the first pigment component.

20 Claims, 1 Drawing Sheet

(51) Int. Cl.
*C04B 41/85* (2006.01)
*C04B 41/00* (2006.01)
*C04B 41/50* (2006.01)
*G04B 37/22* (2006.01)
*C04B 35/10* (2006.01)
*C04B 111/82* (2006.01)

(52) U.S. Cl.
CPC .......... C04B 41/5007 (2013.01); C04B 41/85 (2013.01); G04B 37/226 (2013.01); *C04B 2111/82* (2013.01); *C04B 2235/9661* (2013.01)

(56) References Cited

U.S. PATENT DOCUMENTS

| | | | | |
|---|---|---|---|---|
| 6,517,623 | B1* | 2/2003 | Brodkin | C03B 19/06 106/35 |
| 7,897,253 | B2* | 3/2011 | Fink-Petri | B82Y 30/00 428/325 |
| 2008/0026207 | A1* | 1/2008 | Fink-Petri | B82Y 30/00 428/328 |
| 2013/0341812 | A1* | 12/2013 | Schechner | A61K 6/0094 264/17 |

FOREIGN PATENT DOCUMENTS

| | | |
|---|---|---|
| EP | 0927710 A1 | 7/1999 |
| WO | 0210092 A1 | 2/2002 |
| WO | 2008000716 A1 | 1/2008 |
| WO | 2011120181 A1 | 10/2011 |

OTHER PUBLICATIONS

PCT International Search Report completed by the ISA/EP on Apr. 3, 2014 and issued in connection with PCT/EP2013/077606.
Written Opinion of the ISA/EP completed on Apr. 3, 2014 and issued in connection with PCT/EP2013/077606.

* cited by examiner

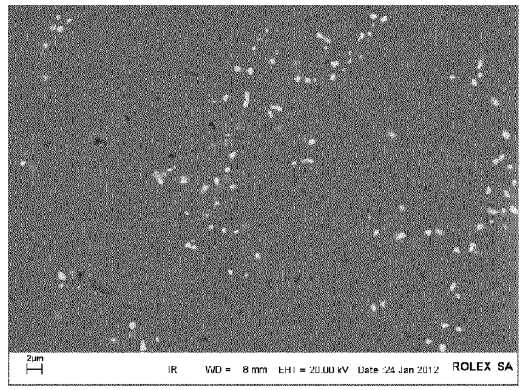 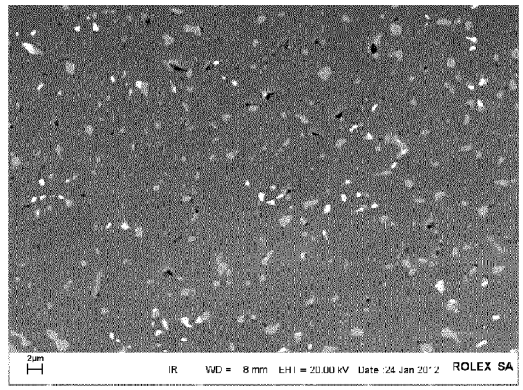
Fig. 1(a)　　　　　　　　　　Fig. 1(b)
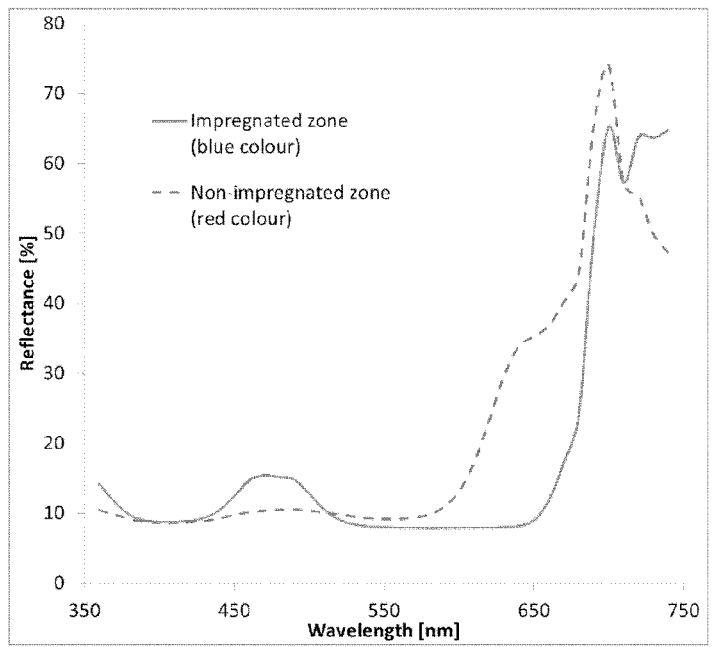
Fig. 2

COLOURED TECHNICAL CERAMIC BODIES AND METHOD FOR PREPARING THE SAME

This application is a U.S. national counterpart application of international application Ser. No. PCT/EP2013/077606 filed Dec. 20, 2013, which claims the benefit of European Patent Application No. 12198975.0 filed Dec. 21, 2012.

TECHNICAL FIELD

The present invention relates to novel coloured ceramic bodies. The present invention furthermore relates to a method for the formation of such coloured ceramic bodies.

BACKGROUND ART

Technical ceramic bodies are well-known in the state of the art. They display a number of properties which make them suitable for a range of different applications. More in particular, such properties are hardness, physical stability, extreme heat resistance and chemical inertness, among others.

In many applications technical ceramic bodies are provided as coloured products. Colouring of the technical ceramic bodies leads to products which combine the favourable properties of the technical ceramic bodies with the aesthetic property of a particular colour. Applications where the colour increases the value of the products, or in other words where aesthetic properties are relevant, are applications in connection with jewelry or wrist watches.

The impregnation of technical ceramic products in order to achieve a colouring of the product is described in DE 2012304. Coloured ceramic products are achieved according to the teaching of the document by impregnating molded parts with aqueous solutions of colourant heavy metal compounds. The molded parts are prepared from suitable ceramic materials such as clay and kaolin which are formed into the wanted shape and treated with heat in the range of 800 to 1400° C. No pigment is present in the molded parts and the colouring is entered in the phase of the impregnation with the aqueous solution.

In WO 00/15580 the impregnation of ceramics is described for materials which comprise a non-coloured metallic oxide of spinel- or rutile-structure ($TiO_2$, $SnO_2$, $ZrO_2$ or $ZrSiO$) that serves as a host lattice to fix bivalent or trivalent metallic ions. The ions are introduced through impregnation of an aqueous solution and allow to colour the ceramic. No indication of conditions used for pre-sintering, impregnation and drying is given. All examples concern the impregnation of clay by Ti/Sb/Cr solutions and yield yellow-ocre colours.

Faulkner & Schwartz (in "High Performance Pigments", Wiley-VCH Verlag GmbH, 2009) describe aluminate-based pigments as "the combination of cobalt and aluminum oxides in a spinel-type stoichiometry ($AB2O4$ with A: Co and B: Al) that yields the blue cobalt aluminate spinel". The colour of the spinel may be changed through the addition of other metals, such as zinc, magnesium, titanium or lithium.

In WO 2011/120181 A1 the preparation of coloured alumina-based opaque ceramics is described. The addition of an oxide of a metal chosen from chromium, cobalt, nickel, manganese, vanadium, titanium and iron leads to a coloured product. The preferred product described in the document is a red coloured technical ceramic body prepared from alumina containing chromium oxide.

BRIEF DESCRIPTION OF THE DRAWINGS

FIG. 1 Microstructures of the "red"-coloured (a) and "blue"-coloured (b) zones after sintering of a ceramic body according to the invention.

FIG. 2 Reflectance spectra of the "red"-coloured and "blue"-coloured zones after sintering of a ceramic body prepared according to the invention.

DISCLOSURE OF THE INVENTION

Problems to be Solved by the Invention

An object of the present invention is to provide a method for producing coloured technical ceramic bodies which is capable to produce bi-coloured or multi-coloured technical ceramic bodies. The main challenges in the realization of such components are to obtain a suitable second colour from a previously coloured ceramic, and to ensure that the demarcation between the different coloured zones is clean and sharp, while retaining highly favourable mechanical properties.

The colour of a technical alumina ceramic component can be modified by impregnation of the green body with a metallic salt solution.

Means for Solving the Problems

As the result of various intensive research for achieving the above object, the present inventors have found that a method of providing a composition comprising alumina and a pigment component, preparing a green body from this composition and treating a part of the area of the green body with a metal-containing preparation, in particular impregnating a part of the surface and/or volume of the green body with a solution of at least one metallic salt, makes it possible to obtain a final product of high technical quality and beautiful exterior.

The present invention has been accomplished on the basis of the above finding.

1. Method for the production of a coloured technical ceramic body, comprising the following steps:
   providing a composition comprising alumina, at least one pigment component and optionally binder materials,
   preparing a green body from this composition,
   optionally debinding the green body,
   thereafter subjecting the green body to a treatment with a metal-containing preparation as a further pigment component, and
   sintering the treated green body.
2. The method of aspect 1, wherein the composition comprises the binder materials and the method includes the debinding step which consists in treating the green body with heat, or in treating the green body with an aqueous solution and subsequently drying the treated green body.
3. The method of aspect 1 or 2 wherein the at least one pigment component is a metal selected from the group consisting of chromium, nickel, manganese, vanadium, titanium and iron which metal is present in substitution at one of the alumina lattice sites.
4. The method of any of the previous aspects wherein the composition wherein the composition which is provided in the first step contains magnesium in an amount of 0.0008 to 5% by weight, calculated as the amount of magnesia in the composition.
5. The method of any of the previous aspects wherein the composition which is provided in the first step consists of:

0.4-5% by weight of at least one of Cr, Co, Ni, Mn, V, Ti or Fe 0.0008-0.5% by weight of Mg, 0.05-6% by weight of a lanthanide element, and up to 100% weight alumina, these amounts being calculated on the basis of the oxides of the elements which are present.

6. The method of claim any of the previous aspects, the composition consisting of 1.0-3.0 wt-% of $Cr_2O_3$, 0.05-0.5 wt-% of MgO, 0.1-5 wt-% of $Er_2O_3$ and the remainder of alumina.

7. The method of any of the previous aspects, wherein the treatment with heat for debinding the green body is conducted at a temperature in the range of 700 to 1200° C.

8. The method of any of the previous aspects, whereby the green body is subjected partly to treatment with the metal-containing preparation.

9. The method of any of the previous aspects, wherein the treatment with the metal-containing preparation is an impregnation with a solution of at least one metallic salt as a further pigment component, which is followed by drying of the impregnated body.

10. The method of aspect 9, wherein the impregnating solution is a solution of at least one salt of a metal selected from the group consisting of Co, Cu, Cr, Fe, Mg, Mn, Mo, Ni, Ti, and Zn in water and/or if appropriate at least one organic solvent.

11. The method of aspect 9 or 10, wherein the drying step after the impregnation is conducted at ambient temperature during 12 to 24 hours, or at 60-100° C. during 1 to 60 minutes.

12. The method of any of the previous aspects, wherein the green body which has been treated with a metal-containing preparation as a further pigment component and has been optionally dried is sintered at a temperature between 1250 and 1700° C., preferably at a temperature between 1550 and 1670° C.

13. The method of any of the previous aspects, wherein the coloured technical ceramic body is a watch component, in particular a watch bezel or a watch case.

14. A coloured technical ceramic body, consisting of alumina as a technical ceramic material, the technical ceramic body comprising a first coloured area and a second coloured area of a different colour, whereby the first coloured area contains a first pigment component, and the second coloured area contains a second pigment component in combination with the first pigment component.

15. The coloured technical ceramic body according to aspect 14, wherein the first pigment component is Cr present in substitution in the alumina crystal lattice and the second pigment component is a complex inorganic pigment compound showing a spinel crystal structure of space group Fd-3m.

16. The coloured technical ceramic body according to aspect 14 or 15, wherein the first coloured area has a red colour and the second coloured area has a blue colour.

17. The coloured technical ceramic body of any of aspects 14 to 16 which is a watch bezel.

DETAILED DESCRIPTION OF THE INVENTION

First, the method of the present invention is described.

The method of the present invention is related to the preparation of coloured technical ceramic bodies.

In a first step of the method of the present invention a green body is prepared from a composition comprising a technical ceramic material and a pigment component, hereafter "the composition".

Generally speaking, technical ceramic materials display a number of properties which make them suitable for a range of different applications. More in particular, such properties are hardness, physical stability, extreme heat resistance and chemical inertness.

The technical ceramic bodies produced in the method according to the present invention consist of a technical ceramic material. The technical ceramic material which is used in the method of the present invention can be for example the type of technical ceramic material which is described in WO 2011/120181 A1. The technical ceramic material described in WO 2011/120181 A1 consists of doped alumina.

According to the method of the present invention, the major component of the composition is alumina. As will be described later, the presence of aluminum is essential for the generation of the colours in the technical ceramic bodies. The wanted effect of the method of the present invention is to obtain a technical ceramic body with areas of different colours and this effect is achieved with alumina as the major component in the technical ceramic body. It may be possible to apply the concept of the present invention to other materials as the major component of the composition.

The at least one pigment component as a further component which is present in the composition is at least one colouring dopant or colouring impurity, which is a transition metal or a rare earth metal, in particular a transition metal selected from the group consisting of chromium, copper, cobalt, nickel, manganese, vanadium, titanium and iron. The colouring dopant (or a plurality of colouring dopants) is dispersed in the crystalline lattice of the major component, and is in general present in substitution at one of the lattice sites, preferably in substitution to aluminium. Such metallic ions in the pigment component induce a colouration of the material when they are dispersed in the crystal lattice with the appropriate coordination and oxidation state. The choice from these metals is an important choice, since the choice of a metal from this selection determines the colour of the technical ceramic bodies as the final product which is obtained in the method of the present invention. The preferred metal according to this selection is chromium. A technical ceramic body prepared according to the present invention which is made from a combination of alumina and chromium displays a red colour and is therefore referred to as a "ruby". This red colour is favourable in the context of the present invention. The choice of a different metal instead of chromium leads to a final colour which may turn out to be a different colour from red. A composition of alumina with iron for instance may lead to a final product which is blue or green depending on the circumstances in the manner of preparation.

The amount of the metal chosen from chromium, cobalt, nickel, manganese, vanadium, titanium and iron is preferably in the range of 0.4 to 5% by weight. This amount is calculated as the amount of the metal as its oxide in the composition in proportion to the weight of the total final composition, including alumina and the further metal components (some of the further metal components may be referred to later as the "pigment components").

A further component which may be present in the composition is magnesium. The amount of magnesium in the composition is 0.0008 to 5% by weight, calculated as the amount of magnesia which is present in the composition.

Yet a further component which is optionally present in the composition is a lanthanide. Any lanthanide may be chosen in the context of the present invention, such as scandium, yttrium, lanthanum, cerium, praseodymium, neodymium, promethium, samarium, europium, gadolinium, erbium, dysprosium, holmium, erbium, thulium, ytterbium and lutetium, and combinations of these metals are possible. It was found that the elements lanthanum, ytterbium and erbium are particularly suitable elements, and that erbium is an especially suitable element.

The amount of the lanthanide in the composition of the present invention is 0.05 to 6% by weight and preferably 0.1 to 5% by weight and more preferably 0.5 to 2.5% by weight.

The above weight ratios have all been provided on the basis of the amount of metal calculated as its oxide which is present in the composition. The amount of alumina which is present in the composition makes up to 100% by weight, accordingly the total weight of alumina, the metal(s) chosen from chromium, nickel, manganese, vanadium, titanium and iron, magnesium oxide and the lanthanide(s) is 100% and the relative amounts of each of the components in the composition is calculated on the basis of this total weight.

In the method of the present invention, the preparation of the composition in the first step of the method does not necessarily require the immediate presence of the metals in an oxide form. They may just as well be provided as different salts, if such salts can be obtained. Such salts may be any of chlorides, nitrates, sulfates, or other suitable salt forms. The essential condition for choosing such different salt forms is the requirement that in the final phase of the method of the present invention, which is the sintering of an intermediate product which has been prepared (the "green body"), the metal salts in the green body react with the other constituent materials to form the corresponding metal oxides.

A particularly preferred composition of the green body comprises 96.5-97.9 wt % of alumina, 1.5-2.9 wt-% of $Cr_2O_3$, 0.1 wt-% MgO and 0.5 wt-% $Er_2O_3$.

The composition may be provided in the form of the solids of the several components. The different solid components may display different particle sizes.

The adjustment to the preferred range of the particle size may be conducted on the dry composition by a conventional manner described in the state of the art. It may also be conducted on the basis of a suspension of the particles in a suitable liquid, for example by ball milling or by attrition.

It is the advantage of the above preferred composition that the technical ceramic body displays a number of favourable properties. The technical ceramic body shows high strength and displays a beautiful red colour.

For preparing the green body further components may be added to the composition comprising the technical ceramic material and the pigment component. For instance the presence of a binder material may be an advantage in the preparation of the green body.

The binders which are optionally used in the preparation of the green body are not particularly limited and any material which is suitable in aiding the formation of the green body may be used. Regularly the binder material is an organic material and as such an organic material a polymer material such as polyethylene, polyethylene glycol (PEG), polyvinyl acetate, polyoxymethylene (POM), polyvinyl butyral (PVB), polytetrafluoroethylene or poly(methacrylate)-co-ethylene glycol dimethacrylate (PMMA) may be chosen.

The presence of such an organic binder makes the formation of the green body easier, in the sense that it can be more easily shaped in a particular form. For the formation of the green body, any conventional method described in the state of the art may be chosen. Such conventional methods for preparing the green body include injection molding, tape casting, dry pressing, slip casting and extrusion. In any of these methods a product of a particular shape is obtained which may be subjected to the further treatments.

For an injection feedstock, the amount of the binder material in the green body is preferably chosen in the range of 15 to 25 parts by weight, relative to 100 parts by weight of the composition comprising the technical ceramic material and the pigment components. The amount of binder material can be different for materials used with processes other than injection, such as in a pressing powder for pressing.

After the formation and shaping of the green body, the material is treated with heat in a first heat-treatment or debinding step. It is one of the purposes of this first step that the binder material is removed, insofar as this has been present during the preparation of the green body. This first step is therefore regularly called "the debinding step". It is the further intention of this first heat-treatment step that the porous volume in the green body is optimized and the material of the green body is solidified in a manner which allows subsequent handling.

The first step is conducted at a temperature in the range of at least 700° C. to less than 1300° C. It is the intention of this first heat-treatment step to generate the appropriate level of porosity in the heat-treated green body. What shall not be achieved is the unwanted reduction of the pore size or even the complete disappearance of pores. Accordingly, a suitable balance between the wanted effect and the avoidance of the unwanted effect will determine the temperature which is chosen for the first step. A preferred range for the temperature in the first sintering step may be the range between 850 and less than 1300°, and will have to be adapted and optimized according to the material and type of binder materials that are used.

The first step is regularly conducted under ambient pressure.

The debinding treatment leads to the generation of open pores in the green body, which makes the subsequent treatment with a metal-containing preparation easier and leads to a better final result. For the successful subsequent treatment the presence of pores is required. The treatment with temperatures in the higher end of the range may lead to the partial closing of the pores which are formed in the same treatment step. On the other hand, it may be recognized that large pores and generally a capillary system of connected voids and pores may lead to diffusion of the impregnating liquid in the lateral direction parallel to the surface of the impregnated article. This diffusing effect may lead to a loss of the sharp demarcation of the impregnated area, which is an unwanted effect as will be described hereafter in connection with the description of the coloured ceramic body of the present invention.

There is a further embodiment in the process of the present invention to achieve the wanted level of porosity. Instead of the step of heat-treatment, it is possible to treat the green body with an aqueous or acidic solution in order to achieve the wanted porosity level. This possibility of a treatment with an aqueous composition is a favourable embodiment since it can be easily performed and does not require the careful control of heating and timing which the pre-sintering requires. A condition for the treatment with the aqueous composition is the suitability of the green body for this kind of treatment. This may be the case, if the binder which has been added in the composition for preparing the green body is easily hydrosoluble, or if at least one of the components which has been added as a binder material is hydrosoluble. Binder material which is used in the art regularly consists of water-soluble as well as water-unsoluble components. The treatment with the aqueous solution may dissolve the components which are soluble in water under the chosen circumstances. The maintained presence of those components which do not dissolve in water shall help to preserve the shape of the green body.

As the aqueous composition for the treatment of the green body to make it porous any of tap water, distilled water or demineralized water may be used. Addition of any further components such as acids, salts or basic materials may be considered, depending on the circumstances. The time for the treatment of the green body with the aqueous composition depends on the composition of the binder material and the porosity level which is desired. The temperature for the treatment may be varied and it is obvious that a higher temperature can lead to an acceleration of the process.

In case of treatment with the aqueous composition, the treated green body shall be dried to remove any remaining water from the pores. Optionally, a heat treatment may also be performed after the treatment with the aqueous composition. The remaining presence of water may have a negative effect on the intended treatment in the next step in the method of the invention and for that reason its absence in the porous green body is preferred.

In the next step the green body which is debinded is subjected to a treatment with a metal-containing preparation. In the context of the method of the invention the metal-containing preparation acts as a further pigment component, whereby the term "further" provides the distinction from the first pigment component which is present in the composition for preparing the green body.

Any kind of treatment with a metal-containing preparation can be applied as long as the intended effect is achieved, which is to provide the metal in the metal-containing preparation to the heat-treated green body in such a manner that it can interact with the material of the composition.

Suitable ways of treatment with a metal-containing preparation are for instance the impregnation with a metallic salt solution, the impregnation with a gel containing metallic particles, the impregnation with a gel containing metal oxide particles, the application of a suspension of nanoparticles on the surface of the heat-treated green body, the deposition of metals on the surface using the method of physical vapour deposition (PVD) and the deposition of metals on the surface using chemical physical vapour deposition (CVD). These methods turned out to be suitable to be used in the method of the invention. In some cases, it may be necessary to perform a heat treatment after the application of metal on the surface of the debinded green body, so that the metal in the metal-containing preparation migrates into the green body and becomes available for the interaction with the material of the composition.

The method which turned out to be the most preferable one is the method of impregnation with a solution of a further pigment component.

Impregnation in the sense of the present invention can be achieved by dipping the green body in an impregnating solution, but can also be achieved by ink jet printing, spraying or brushing, serigraphy or tampography, or any further suitable method for applying a solution on a surface of an object.

The impregnating solution is for example a solution of at least a metal salt.

The metal salt in the impregnating solution may be any kind of metal salt.

The metal used in the metal-containing preparation, according to the preferred embodiment the metal salt in the impregnating solution, shall provide a colour to the treated area which is different from the colour in the area which is not treated. As has been described above, the preferred colour of the untreated final product of the method of the invention is the red colour, leading to a ruby-type final product. The treatment which is conducted on a part of the total area of the porous green body shall lead to a colour in the final product which is in contrast to this red colour, such as for instance a blue or black colour, or a different shade of red.

The metal in the metal-containing preparation, according to the preferred embodiment the metal salt in the impregnating solution, shall be chosen from such metals or metal salts which lead to the generation of such different colours in the treated area.

Suitable metals for preparing the treatment preparation are Co, Cu, Cr, Fe, Mg, Mn, Mo, Ni, Ti, and Zn, among others. The choice from this selection is based on the effect which is wanted to be achieved. It also depends on the composition of the green body.

It has turned out that in an embodiment, in which the composition of the green body comprises chromium, magnesium and erbium, the treatment with a metal-containing preparation comprising cobalt, zinc or iron leads to particularly favourable effects. The metal-containing preparation, such as the impregnating solution, may contain these metals as the metals or their metal salts or other suitable forms alone or in combination.

Treatment of a porous green body which contains chromium (the red ruby type) with a preparation of cobalt leads to a blue colour in the treated area. Treatment of the same type of porous green body with a preparation of a combination of cobalt and any of zinc or iron leads to a blue colour which may have the same or a slightly different quality.

In the preferred embodiment of the treatment through impregnation with a solution of least one metallic salt, the type of salts of the metal salts in the impregnating solution may be any type of salt, provided that the wanted effect is achieved. For the colour which shall be achieved in the technical ceramic body as the final product, the metal cation of the salt shall be responsible and not so much the anionic part. However, a number of practical reasons plays a role in the selection of the suitable salt. Since the impregnation is usually carried out with an aqueous or water-based solution, the metal salt shall be soluble in the solution. It may be a disadvantage to have to work with a salt which happens to be toxic, since this may require a complicated adaptation of the working conditions, so that less toxic salt types will be preferred. Furthermore, of course not all kinds of salts may be available in each case and if available, the level of purity may not comply with the standard of the method. Finally, a pH requirement of the solution of the salt which is not suitable for its use in the impregnation may also disqualify a salt.

Regular salts such as nitrates, chlorides and sulfates may be used, as well as salts of organic acids, such as citrates or oxalates. In most experiments, the nitrate salts turned out to be reliable and suitable and this type of salt is the preferred type of salt for the method of the present invention.

The concentration of the different elements in the solution has to be adjusted to obtain the desired colour, but also to avoid problems following firing. The type of blue colour which is achieved through the impregnation with the solution of the cobalt salt alone is a very intense kind of blue, the addition of the zinc salt to the impregnating solution leads to a lower level of intensity.

As has been described above, green bodies comprising chromium (as its suitable salt or oxide) display finally after sintering a red colour, with the chromium atoms as the colouring dopant dispersed in the crystalline lattice. The treatment with a preparation comprising cobalt leads in the final technical ceramic body to the generation of a blue colour in the treated area. When the treatment is conducted through impregnation, this effect can be achieved by the impregnation of the porous green body with a solution of a salt of cobalt with a concentration of 0.1 mol/l to 1.5 mol/l (these values being included), in particular with a solution of $Co(NO_3)_2$ in this concentration range. The liquid for preparing this solution shall normally be water, such as preferably distilled water, and/or if appropriate at least one organic solvent.

According to a further embodiment of the method of the present invention it is possible to treat the porous green body with a preparation comprising a combination of cobalt and zinc. In a preferred embodiment the porous green body is impregnated with a solution containing a combination of the salts of cobalt and zinc. In such combined impregnating solutions the concentration of the salt of cobalt may vary between 0.1 mol/l and 1.5 mol/l (these values being included). The ratio of the concentration of the cobalt salt to the concentration of the zinc salt may vary between 0.33 and 1. A typical impregnating solution according to this embodiment contains $Co(NO_3)_2$ at a concentration of 0.33 mol/l and $Zn(NO_3)_2$ at a concentration of 0.66 mol/l.

According to yet a further embodiment of the method of the present invention, it is possible to impregnate the porous green body with a solution containing a combination of the salts of cobalt and iron. In such combined impregnating solutions, the concentration of the salt of cobalt may vary between 0.1 mol/l and 1.5 mol/l (these values being included). The ratio of the concentration of the cobalt salt to the concentration of the iron salt may vary between 0.5 and 2. A typical impregnating solution according to this embodiment contains $Co(NO_3)_2$ at a concentration of 0.85 mol/l and $Fe(NO_3)_3$ at a concentration of 0.5 mol/l.

It is in principle possible to subject the complete porous green body to the treatment, but it is a typical embodiment of the present invention to treat only a part of the total surface of the porous green body. This partial impregnation of the porous green body leads after final sintering to the production of a bi-coloured technical ceramic body displaying different colours, in the sense that there is a first coloured area and a second coloured area displaying a different colour. It is also possible to perform multiple partial treatments of the porous green body, leading after final sintering to the production of a multi-coloured technical ceramic body displaying different colours.

The local colouration can be realized by physical masking and subsequent dipping, e.g., with adhesive tape, with photosensitive resin; by local deposition of the solution by tampography or serigraphy or ink-jetting, or any other method that is adapted to the localized and controlled delivery of a liquid solution onto a surface.

The duration of the treatment shall warrant the sufficient introduction of the pigment component. When the treatment by impregnation by dipping is chosen, the duration may generally be adjusted to be conducted during 0.25 to 20 minutes, preferably between 0.25 and 15 minutes and more preferably between 0.25 and 10 minutes. It has been surprisingly observed that a duration of the impregnation of below 1 minute provides a result which is highly satisfactory. So, impregnations during a period as short as from 15 to 45 seconds may lead to the wanted result.

The method of treatment with the metal-containing preparation according to the method of the invention, in particular the preferred impregnation with the impregnation solution, leads to a penetration of the metal component of the metal-containing preparation into the porous green body. This penetration in the depth of the porous green body which means in a direction perpendicular to the surface of the porous green body leads to a good quality of colouration, which for instance is not affected in a negative manner by a later polishing treatment, or any similar final treatment of the surface. On the other hand, the metal-containing preparation should preferably not diffuse in a lateral direction, that is in a direction which is parallel to the surface of the porous green body, since this would lead to a demarcation of the coloured zones which is not sharp. It is the unexpected observation in connection with the method of the present invention that a limited lateral diffusion is observed and the demarcation between the coloured zones in the sintered product is sharp.

A property which may influence the diffusion which is observed in the impregnation treatment is the viscosity of the impregnating solution. A liquid of increased viscosity leads to less diffusion in the green body and the quality of the result which is achieved is accordingly better. Any thickening agent may be used as an optional component in the context of the present invention. Suitable thickening agents are the different types of polyethylene glycol, but basically any conventional thickening agent may be used such as glycerol, cellulose ether, hydroxycellulose ether, glycerol, ethylene glycol, polyacrylic polymers, polymethacrylic polymers, vinyl polymers, polycarboxylic acids, polyimines and polyamides. The optionally present conventional thickening agent is fired off during the heat treatment in the final sintering step. Another parameter which influences the diffusion is the temperature.

The impregnation of the porous green body is usually conducted with one single impregnating solution. The impregnating solution contains all required components in the appropriate concentration.

It is also possible to conduct the treatment with the metal-containing preparation in a sequential manner, whereby the impregnation in the basic manner as described above is conducted with two or more single solutions one after the other. After each of the impregnating steps in the sequential impregnation the impregnated green body is freed from any remaining liquid. The important step of drying in the method of the present invention is conducted in this particular embodiment after the completion of the impregnation with the last impregnation in the sequence of separate impregnations.

A further embodiment involving more than one treatment step shall be chosen when more than two colours are required in the final product. Different treatments involving different treated areas are possible and in this embodiment the method can be implemented for example by the separate covering of chosen areas in a number of subsequent steps, or by ink-jetting different solutions on different areas. In this manner different designs of the final sintered product may be achieved.

After the impregnation of the green bodies with the impregnating solution the resulting impregnated green body is subjected to a thorough drying procedure. A typical drying step in the context of the present invention is a drying in air during a few minutes to several hours, such as for example 3 to 24 hours, at ambient temperature. Other temperatures may be chosen as well, such as any temperature between ambient temperature and 100° C. The duration of the drying step may be adapted to the chosen temperature. The drying step is an essential step in the method of the present invention using impregnation, although varying the conditions does not lead to different colouring. In an industrial environment, it may be important to optimize the drying step in order to eliminate most of the water and HCl (if any chloride salts are used in the impregnating solution) before sintering.

Other ways of treatment with metal-containing preparations usually do not require a separate drying step.

After the treatment with metal-containing preparations, and, in case of impregnation, after having been thoroughly dried, the treated body is sintered. A conventional sintering, that is a densification of the green body with a conventional sintering process, can be conducted at a temperature in the range of higher than 1250 to 1700° C., preferably at a temperature between 1550 and 1670° C. Regularly the sintering is conducted at the temperature of 1600° C. The temperature may depend on the circumstances of the case. Accordingly, the composition of the metal-containing preparation is a relevant parameter to determine the sintering conditions and in particular the sintering temperature.

The sintering manner implies the maintenance of the sintering temperature during a certain period of time, the so-called soak-time. Regularly a soak-time of 2 hours is sufficient to achieve the sintering effect. Shorter or longer soak-times may be chosen if required, such as between 1.5 and 3 hours. The total sintering procedure requires a period of heating until the final sintering temperature is reached and a period of cooling after expiry of the soak-time. The duration of the total sintering procedure including heating and cooling may be in the range of 24 to 32 hours.

The sintering is conducted under oxidizing conditions, which means that oxygen needs preferably to be present. Accordingly the sintering may be conducted in the presence of any oxygen containing gas, such as preferably air. It is possible that the sintering could be conducted under non-reducing conditions, such as under a neutral atmosphere, provided that the colouring dopant is in the required oxidation state (e.g., $Cr^{3+}$ for the case of Cr in ruby).

During sintering, the colour of the substrate (which means the colour of the area of the ceramic body which is not treated with the metal-containing preparation), as well as the colour of the treated area, are formed. According to the typical arrangement in the inventive coloured technical ceramic body, the colours in these two areas shall be different.

The colour in the area of the ceramic body which is not treated with the metal-containing preparation depends on the composition which is used in the preparation of the green body. The preferred colour may be red such as in the case of the presence of $Cr^{3+}$ ions in alumina. The area which is impregnated displays a different colour. The colour which is obtained in the treated area depends on the colouring dopant in the composition used in preparing the green body as well as on the metal in the metal-containing preparation, since the colour after treatment shall be generated through the combination of the colour generated by the colouring dopant in the composition used in preparing the green body and the metal in the metal-containing preparation.

According to a preferred embodiment of the present invention, the surface which is not treated has a red colour, whereas the treated surface displays a blue colour. The combination of the red colour with the blue colour is a combination which is highly preferred, since the combination provides a contrast which is easily observed.

The efficiency of the impregnation does not appear to depend on the kinds of counter-ions which are present in the impregnating solution. This aspect has been investigated in connection with impregnating solutions containing Co or Zn. The salts of these metals were provided as chlorides as well as nitrates and were investigated in different combinations and concentrations. All combinations provided a blue colour in the impregnated area in technical ceramic bodies comprising Cr in alumina.

In the treated area pigment particles are identified in a separate spinel-like phase. In this phase the size of the pigment particles is typically 1-2 µm.

It is observed that some of the materials which are present in the composition for preparing the green body and the metal salts contained in the impregnation solution form one pigment component phase in the sintered product. The metal components in the metal-containing preparations infiltrate into the porous structure of the green body. At the high temperature of the sintering step and under the oxidizing conditions maintained in this sintering step, some of the materials as well the metal components originating from the metal-containing preparation are converted into a pigment component phase, which is responsible for the final colour which is observed.

One possible explanation could be as follows. During sintering, a metal oxide which is formed from the metal salt in the impregnating solution may react with the alumina as the component of the green body in the following manner:

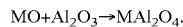

$$MO + Al_2O_3 \rightarrow MAl_2O_4.$$

In case of the presence of the cobalt salt in the impregnating solution as the preferred embodiment for the impregnating solution, the reaction which takes place during sintering is probably the following reaction:

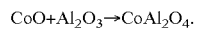

$$CoO + Al_2O_3 \rightarrow CoAl_2O_4.$$

In case of the presence of a cobalt salt and a zinc salt in the impregnating solution as the preferred embodiment for the impregnating solution, a $Co_xZn_{1-x}Al_2O_4$ compound is probably formed after sintering.

Accordingly in this reaction a spinel compound is generated. Commonly, this spinel compound corresponds to a cubic phase of space group Fd-3m, which is the same phase as the spinel-type $CoAl_2O_4$ pigment of blue ceramic. This phase is known to accept other elements on the $Co^{2+}$ and/or $Al^{3+}$, that can be occupied by, e.g., Al, Co, Cr, Cu, Fe, Mn, Mo, Ni, or Zn with the corresponding oxidation state. Depending on the composition, the colour and the lattice parameter will vary, thereby shifting the X-ray lines. This compound which is formed according to this last reaction displays a blue colour in the case of metal salts containing Co, Zn and/or Fe, as shown in the examples.

According to one of the embodiments of the formation of the porous green body, the green body was treated with an aqueous solution whereby those components from the binder material which are soluble in water are dissolved and the components which are not soluble under the chosen treatment circumstances remain in the porous green body. In this case, the sintering of the impregnated and dried green body will remove the binder material which is still present. In other cases of the treatment with heat in the pre-sintering step, normally no binder material is observed after the pre-sintering step.

A further embodiment of the method of the present invention is to treat in a first step the whole surface of the ceramic body, for example with a first impregnation solution, and to treat in a second step only part of the surface, for example with a second impregnation solution. This double treatment, in particular in the form of a double impregnation, allows to obtain two colours that are different from the colour that is obtained with the non-impregnated starting material. Such a double treatment can be of interest, for example, to adjust finely the colour of the substrate. As an illustrative example, it is thus possible to obtain a darker shade or hue (e.g., with Fe, Ni, Cr, and/or Co-containing solutions in the case of impregnation) or a lighter shade or hue (e.g., with Al-containing solutions in the case of impregnation) of the colour of the non-impregnated starting material, in combination with the second, more contrasting colour obtained with the combination of the first and the second impregnation solutions. As an alternative, only part of the surface of the ceramic body can be treated in a first step, for example with a first impregnation solution, and another part of the surface can be treated in a second step, for example with a second impregnation solution.

Finally, as the last action in the production of coloured technical ceramic body, the products may be polished or subjected to any other final treatment to achieve an exterior appearance in compliance with the intended use. This last action is optional and depends on the intended use of the sintered product.

The technical ceramic bodies which are obtained according to the method of the invention shall be used in different applications. Such applications are for instance in watch making applications, for example as a bezel or as part of a watch case. Such applications particularly take advantage of the aesthetic advantage of the method of the present invention of preparing a technical ceramic body which displays a favourable combination of different colours. At the same time, such applications require a considerable strength of the technical ceramic bodies to make their use in watch making applications possible. It has been observed in the method of the present invention that the technical ceramic bodies which are produced according to the method of the invention display a favourable strength and that the impregnation treatment does not weaken the impregnated part of the technical ceramic bodies. The high degree of mechanical resistance and toughness of the technical ceramic bodies make them suitable for any exposure to the elements, and common shocks will not damage the technical ceramic bodies.

The effect of the method of the present invention of obtaining a technical ceramic body with areas of a different colour could not be expected. As described above, in the preferred embodiment according to the method of the present invention, the material of the green body comprises chromium in alumina as the base material. Such a composition provides a red colour after sintering. The treatment of a green body of this preferred composition with a metal-containing preparation leads to the generation of a blue colour in the treated area. This is an effect which could not be expected. In technical ceramic bodies made from a composition of alumina with chromium, the red colour observed after sintering is believed to be caused by the absorption (and in a small part by re-emission) of light from electronic levels induced by the presence of dispersed metallic ions. The colouring which is displayed in the treated area of the technical ceramic body is caused at least in part by spinel compound particles which are generated through the treatment and subsequent sintering, and which form an additional phase in the technical ceramic body. Accordingly, the two coloured areas in the technical ceramic bodies display a colouring effect based on different physical phenomena.

It has also to be noted that the final colour may be influenced by multiple process and material parameters: the colour of the substrate (concentration of Cr in the ruby), the sintering temperature, the pore size distribution of the substrate prior to the treatment, in particular prior to the impregnation step, in the case of using impregnation the viscosity of the impregnation liquid and the surface tension of the impregnation liquid and of the substrate, the concentration of metals and/or metallic salts in the preparation or solution, the drying kinetics and conditions (temperature, time, etc.), and the technique and conditions used for the treatment (in case of impregnation the choice of dipping or ink-jetting—and in the case of ink-jetting, parameters such as drop size, resolution, number of print repetitions). It will therefore be necessary to adjust and optimize the process parameters to a given experimental situation.

In conclusion, the method of the present invention displays a number of surprising effects:
- the mechanical properties such as hardness, toughness and elastic modulus are not significantly influenced by impregnation;
- the microstructure remains homogeneous and fine-grained;
- the added elements are located at the pigment component particles ($CoAl_2O_4$-like structure) dispersed in the matrix; and
- the concentration of added elements is markedly lower than for commercially available samples of similar colour.

Next, the coloured technical ceramic bodies are described.

The coloured technical ceramic bodies of the present invention contain alumina as a ceramic material, as described above in connection with the method for the preparation of the coloured technical ceramic bodies.

The coloured technical ceramic bodies according to the present invention are not particularly limited according to their shape and may display any wanted form.

The coloured technical ceramic bodies according to the present invention display different coloured areas which are achieved by applying the method of the present invention as described above. Any combination of colours is possible, the first area may for instance be red, blue or green, the second area blue, green or black. It is also possible that the two coloured areas display different shades of red. The choice of the colours depends on the intended use of the technical ceramic bodies and technical as well as purely aesthetic reasons may play a role. According to a preferred embodiment of the technical ceramic bodies, a first area of the technical ceramic body is red, whereas a second area is blue.

The coloured technical ceramic bodies comprise a first coloured area and a second coloured area of a different colour. The arrangement of the present invention allows the possibility of further areas of different colours, such as for instance a third area of a further different colour and/or a fourth such area. Although this option is specifically intended as a further possible embodiment of the present invention, it will not be discussed in further detail. The description of the embodiment of a technical ceramic body with two different colours will make it clear to the person skilled in the art how to obtain technical ceramic bodies with more than two coloured areas.

The specific colours in the two areas of different colour are determined by the pigment components which are present. The pigment component in the first area is selected on the basis of the wanted colour in this first area as well as in the second area.

It is particularly preferred to provide a first area of the technical ceramic bodies which displays a red colour, whereas the second area of the technical ceramic bodies displays a blue colour. Further possible colours of the first area are for example a blue color or a green color.

It is a particular feature of the technical ceramic bodies of the present invention that the demarcation between the two areas of different colour is along a sharp line. This is one of the advantages of the method of the present invention for the production of a coloured technical ceramic body which allows for a formation of the second colour in the second area of the technical ceramic bodies along such a sharp line.

The coloured technical ceramic bodies of the present invention are further distinguished by the usual properties of such materials, such as typically the density and the toughness. This includes in particular a favourable mechanical resistance which is in many cases the motivation to choose ceramic materials for particular functions. A treatment with solutions may influence the properties of the final ceramic materials in any direction, so that in principle a deterioration of initially favourable properties would be possible. It is the surprising observation of the present invention that the coloured technical ceramic bodies of the present invention display the same kind of mechanical properties as displayed by the same type of ceramic materials without the treatment with the metal-containing preparation along the manner of the method of the present invention.

The coloured ceramic technical bodies of the present invention can be used in various applications. Since the coloured ceramic technical bodies of the present invention display the usual properties of conventional coloured ceramic technical bodies, they may be used in all applications in which ceramic technical bodies are regularly used.

Obviously, the additional aspect of the colouring makes the coloured ceramic technical bodies of the present invention highly appropriate for applications for which the colouring provides an additional value. Such applications are regularly found in ornamental articles such as exterior components for watches, watch cases, broaches, tie pins, cuffing links, exterior components in cell phones and exterior components in home appliances. Coloured ceramic technical bodies are particularly suitable for use in watch cases and bi-coloured watch components, in particular components for the watch case such as red-blue or red-black bezels. The combination of the mechanical properties with the aesthetic properties makes this a highly suitable application.

EXAMPLES

Methods used in the examples:
Density
The density is measured following Archimedes' method with absolute ethanol. Each sample is measured three times and the mean value is calculated.
Colorimetry
L*a*b* measurements are performed after machining and polishing the sample, on the free side (ie the side that was not in contact with the sample holder during heat treatment), with an aperture of 7 mm on three different locations. The equipment is a Minolta CM3610d with D65 illuminant. The colorimetry is indicated as the difference in colour $\Delta$ELab (or $\Delta$E) between the measurement and the colour of a reference sample (commercial ceramic of the targeted colour, obtained with a standard pigment). $\Delta$ELab is calculated as $\Delta E=(\Delta L^2+\Delta a^2+\Delta b^2)^{0.5}$.
Toughness
The measurements of the toughness were performed by indentation with a KB250 Prüftechnik GmbH equipment. The HV3 indentations were realized under a charge of 3 kg applied during 15 s. The toughness is evaluated through the formula proposed by K. Niihara:

$$K1c=0.0089(E/Hv)^{2/5} \cdot P/(a/(c-a)^{0.5})$$

where E is the elastic modulus (measured value: 390 GPa), Hv is the hardness in GPa, P is the charge in N, a is the diagonal of the indentation mark and c is the length of the crack formed following indentation.
Microhardness
HV1 microhardness was measured with a LEICA VMHT MOT equipment with a charge of 1 Kg during 15 s. 10 measurements were performed per sample.
Young's Modulus
The Young's modulus and Poisson ratio were measured by acoustic microscopy (non-destructive control by ultrasounds). The relative measurement uncertainty is 2% for both parameters.

Example 1

An injection feed stock was prepared of the following composition:
Mineral Charge:
97.9% by weight alumina;
1.5% by weight $Cr_2O_3$;
0.1% by weight MgO;
0.5% by weight $Er_2O_3$;
to which
binder materials are added to reach a concentration of 20% by weight in the final feed stock.

The composition was injected in a mold and treated with heat at 1050° C. in air for 20 hours for debinding, which led to the generation of pores in the molded material. The porous green body showed open porosity and displayed sufficient mechanical strength to be safely manipulated.

Thereafter the porous product was partly masked with adhesive tape and subjected to impregnation treatment by dipping it into an impregnating solution.

The composition of the impregnating solution was 0.4 mol/l of $Co(NO_3)_2$ in distilled water. The duration of the impregnation was a few seconds. The impregnated molded green body was then taken out and dried at ambient temperature for 24 hours.

In the next step the dried impregnated molded green body was sintered at 1600° C. for 24 hours.

The resulting technical ceramic body displayed a red colour at the part of the surface which had not been impregnated. The impregnated part of the surface displayed a deep blue colour ("cobalt blue").

The demarcation between the two areas was along a straight line. The taping with the adhesive tape had closed the pores directly underneath the tape and leakage of the solution underneath the tape had been prevented. The tape which had been used was watertight and accordingly prevented the impregnation of the part located underneath the tape.

The results of the example are displayed in table 1.

Examples 2 to 18

In examples 2 to 18, the composition of the injection feed stock and the impregnating solution were varied in comparison to the preparation in example 1.

In the examples 2 to 4 and 16, the amount of chromium oxide in the feed stock was 1.5% by weight, as in example 1. In the examples 5 to 8 and 17, the amount of chromium oxide was changed to 2.0% by weight. In the examples 9 to 15 and 18, the amount of chromium oxide was 2.88% by weight.

In the examples 2 to 18 the composition of the impregnating solution was changed in the manner indicated in table 1. The pre-sintering treatment of the green body was the same as in example 1 at 1200° C.

The sintering temperature was the same as in example 1 at 1600° C., except for example 13.

Also the further conditions were identical to the ones in example 1.

EDX analysis confirmed that the additional phase in the "blue" zone comprised Co in addition to Al, Cr and O, which corresponds to the element added by impregnation. Co is only present in this phase and not in the alumina matrix.

A similar behaviour was observed for a disk impregnated with a CoZn solution that was sintered at 1570° C. with 2 h soak-time. The Co and Zn were present only in grains of typically 1 μm grain size embedded in the ruby matrix, with additional erbium-aluminate grains as in the non-impregnated regions.

Example 20

A technical ceramic body was prepared in the same manner as disclosed for example 2. The impregnated porous body was sintered at 1590° C. for 2 h.

A control technical ceramic body was prepared in the same manner but without the impregnation step.

The sintered technical ceramic bodies which were obtained was subjected to an investigation of its reflectance spectrum.

The results of the experiments are provided in FIG. 2. In the impregnated sample, reflection features are observed in the blue (446-500 nm) and in the red (620-780 nm) part of

TABLE 1

| Ex. | [Co(NO$_3$)$_2$] | [Zn(NO$_3$)$_2$] | [Fe(NO$_3$)$_3$] | Cr$_2$O$_3$ conc. in mineral charge [wt %] | Sintering temp. [° C.] | Colour |
|---|---|---|---|---|---|---|
| 1 | 0.4 | 0 | 0 | 1.5 | 1600 | Cobalt blue |
| 2 | 0.5 | 0.5 | 0 | 1.5 | 1600 | Cobalt blue |
| 3 | 0.33 | 0.66 | 0 | 1.5 | 1600 | Cobalt blue |
| 4 | 0.25 | 0.75 | 0 | 1.5 | 1600 | Cobalt blue |
| 5 | 0.4 | 0 | 0 | 2.0 | 1600 | Cobalt blue |
| 6 | 0.5 | 0.5 | 0 | 2.0 | 1600 | Cobalt blue |
| 7 | 0.33 | 0.66 | 0 | 2.0 | 1600 | Cobalt blue |
| 8 | 0.25 | 0.75 | 0 | 2.0 | 1600 | Cobalt blue |
| 9 | 0.4 | 0 | 0 | 2.88 | 1600 | Cobalt blue with reddish hue |
| 10 | 0.5 | 0.5 | 0 | 2.88 | 1600 | Cobalt blue |
| 11 | 0.33 | 0.66 | 0 | 2.88 | 1600 | Cobalt blue |
| 12 | 0.25 | 0.75 | 0 | 2.88 | 1600 | Cobalt blue |
| 13 | 1 | 0 | 0 | 2.88 | 1625 | Cobalt blue |
| 14 | 1.697 | 0 | 0 | 2.88 | 1600 | Cobalt blue |
| 15 | 0.5 | 0 | 0.85 | 2.88 | 1600 | Midnight blue - black |
| 16 | 0.25 | 0.25 | 0 | 1.5 | 1600 | Cobalt blue |
| 17 | 0.25 | 0.25 | 0 | 2.0 | 1600 | Cobalt blue |
| 18 | 0.25 | 0.25 | 0 | 2.88 | 1600 | Cobalt blue |

The concentrations of Co(NO$_3$)$_2$, Zn(NO$_3$)$_2$ and Fe(NO$_3$)$_3$ are given in the table as mol/l.

Example 19

A bi-coloured bezel was prepared in the manner as described for example 1. This bezel was impregnated with a 0.5 mol·l$^{-1}$ Co(NO$_3$)$_2$ solution. Final sintering was conducted at 1650° C.

The red and blue-coloured regions of the bicoloured bezel obtained after final sintering were characterised by scanning electron microscopy.

The FIG. 1 shows the microstructure after sintering of non-impregnated (red colour) and impregnated (blue colour) zones. The "red" zone is represented in FIG. 1(a), the bright spots correspond to erbium-aluminate grains Er$_3$Al$_5$O$_{12}$. An additional phase is detected in the "blue" zone represented in FIG. 1(b), which corresponds to the blue pigment that was synthesised in-situ during sintering.

the spectrum. In comparison, the non-impregnated sample displays a reflectance peak in the red part only.

The invention claimed is:

1. Method for the production of a coloured technical ceramic body, comprising the following steps:
   providing a composition comprising alumina as the major component, magnesium in an amount of 0.0008 to 5% by weight, calculated as the amount of magnesia in the composition, at least one pigment component and optionally binder materials,
   preparing a green body from this composition,
   optionally debinding the green body,
   thereafter subjecting the green body to a treatment with a metal-containing preparation as a further pigment component, and
   sintering the treated green body.

2. The method of claim 1, wherein the composition comprises the binder materials and the method includes the debinding step which consists in treating the green body with heat, or in treating the green body with an aqueous solution and subsequently drying the treated green body.

3. The method of claim 1 wherein the at least one pigment component is a metal selected from the group consisting of chromium, nickel, manganese, vanadium, titanium and iron which metal is present in substitution at one of the alumina lattice sites.

4. The method of claim 1 wherein the composition which is provided in the first step consists of:
0.4-5% by weight of at least one of Cr, Co, Ni, Mn, V, Ti or Fe
0.0008-0.5% by weight of Mg,
0.05-6% by weight of a lanthanide element, and
up to 100% weight alumina,
these amounts being calculated on the basis of the oxides of the elements which are present.

5. Method for the production of a coloured technical ceramic body, comprising the following steps:
providing a composition comprising alumina as the major component, at least one pigment component and optionally binder materials,
preparing a green body from this composition,
optionally debinding the green body,
thereafter subjecting the green body to a treatment with a metal-containing preparation as a further pigment component, and
sintering the treated green body,
the composition consisting of
1.0-3.0 wt-% of $Cr_2O_3$,
0.05-0.5 wt-% of MgO,
0.1-5 wt-% of $Er_2O_3$ and
the remainder of alumina.

6. Method for the production of a coloured technical ceramic body, comprising the following steps:
providing a composition comprising alumina as the major component, at least one pigment component and optionally binder materials,
preparing a green body from this composition,
debinding the green body, wherein the treatment with heat for debinding the green body is conducted at a temperature in the range of 700 to 1200° C.,
thereafter subjecting the green body to a treatment with a metal-containing preparation as a further pigment component, and
sintering the treated green body.

7. The method of claim 1, whereby the green body is subjected partly to treatment with the metal-containing preparation.

8. The method of claim 1, wherein the treatment with the metal-containing preparation is an impregnation with a solution of at least one metallic salt as a further pigment component, which is followed by drying of the impregnated body.

9. Method for the production of a coloured technical ceramic body, comprising the following steps:
providing a composition comprising alumina as the major component, at least one pigment component and optionally binder materials,
preparing a green body from this composition,
optionally debinding the green body,
thereafter subjecting the green body to a treatment with a metal-containing preparation as a further pigment component, and
sintering the treated green body,
wherein the treatment with the metal-containing preparation is an impregnation with a solution of at least one metallic salt as a further pigment component, which is followed by drying of the impregnated body, and
wherein the impregnating solution is a solution of at least one salt of a metal selected from the group consisting of Co, Cu, Cr, Fe, Mg, Mn, Mo, Ni, Ti, and Zn in at least one of water and an organic solvent.

10. The method of claim 8, wherein the drying step after the impregnation is conducted at ambient temperature during 12 to 24 hours, or at 60-100° C. during 1 to 60 minutes.

11. The method of claim 1, wherein the green body which has been treated with a metal-containing preparation as a further pigment component and has been optionally dried is sintered at a temperature of between 1250 and 1700° C.

12. The method of claim 1, wherein the coloured technical ceramic body is a watch component.

13. A coloured technical ceramic body,
comprising as a major component of its composition alumina as a technical ceramic material,
the technical ceramic body comprising a first coloured area and a second coloured area of a different colour,
whereby the first coloured area contains a first pigment component, and
the second coloured area contains a second pigment component in combination with the first pigment component,
wherein the first coloured area has a red colour and the second coloured area has a blue colour.

14. A coloured technical ceramic body,
comprising as a major component of its composition alumina as a technical ceramic material,
the technical ceramic body comprising a first coloured area and a second coloured area of a different colour,
whereby the first coloured area contains a first pigment component, and
the second coloured area contains a second pigment component in combination with the first pigment component,
wherein the first pigment component is Cr present in substitution in the alumina crystal lattice and the second pigment component is a complex inorganic pigment compound showing a spinel crystal structure of space group Fd-3 m.

15. The coloured technical ceramic body according to claim 14, wherein the first coloured area has a red colour and the second coloured area has a blue colour.

16. The coloured technical ceramic body according to claim 14 which is a watch bezel.

17. The method of claim 9, wherein the drying step after the impregnation is conducted at ambient temperature during 12 to 24 hours, or at 60-100° C. during 1 to 60 minutes.

18. The method of claim 1, wherein the green body which has been treated with a metal-containing preparation as a further pigment component and is sintered at a temperature of between 1550 and 1670° C.

19. The coloured technical ceramic body according to claim 13, comprising as a major component of its composition alumina as a technical ceramic material and having the following composition:
0.4-5% by weight of at least one of Cr, Co, Ni, Mn, V, Ti or Fe
0.0008-0.5% by weight of Mg, calculated as the amount of magnesia in the composition,
0.05-6% by weight of a lanthanide element, and
up to 100% weight alumina,
these amounts being calculated on the basis of the oxides of the elements which are present.

20. The coloured technical ceramic body according to claim 14, comprising as a major component of its composition alumina as a technical ceramic material and having the following composition:
- 0.4-5% by weight of at least one of Cr, Co, Ni, Mn, V, Ti or Fe
- 0.0008-0.5% by weight of Mg, calculated as the amount of magnesia in the composition,
- 0.05-6% by weight of a lanthanide element, and
- up to 100% weight alumina,
- these amounts being calculated on the basis of the oxides of the elements which are present.

* * * * *